(12) United States Patent
Kawai

(10) Patent No.: US 6,251,814 B1
(45) Date of Patent: Jun. 26, 2001

(54) LIGHT-WEIGHT POTTERY ARTICLE

(76) Inventor: Tadashi Kawai, 12-1, Kawata Kiyomizuyaki Danchi-cho, Yamashina-ku, Kyoto (JP)

( * ) Notice: Subject to any disclaimer, the term of this patent is extended or adjusted under 35 U.S.C. 154(b) by 0 days.

(21) Appl. No.: 09/491,346

(22) Filed: Jan. 26, 2000

(30) Foreign Application Priority Data

Jul. 14, 1999 (JP) .................................................. 11-200007

(51) Int. Cl.$^7$ ............................ C04B 38/00; C04B 33/24
(52) U.S. Cl. ............................ 501/80; 501/141; 501/143; 501/144
(58) Field of Search ............................ 501/80, 141, 143, 501/144

(56) References Cited

FOREIGN PATENT DOCUMENTS

| 63-203555 | 8/1988 | (JP) . |
| 4-114975 * | 5/1992 | (JP) . |
| 9-52781 | 2/1997 | (JP) . |
| 11-43381 * | 2/1999 | (JP) . |

* cited by examiner

*Primary Examiner*—Karl Group
(74) *Attorney, Agent, or Firm*—Kirschstein, et al.

(57) ABSTRACT

This invention provides a light-weight pottery article with lower specific gravity than that of general pottery as well as a process for producing the same. The light-weight pottery article of the invention is produced by adding a lightening agent to clay based on silica and alumina, forming the resulting kneaded material into a desired form and calcinating the formed material, wherein the lightening agent is microspherical hollow ceramic powder having a hollow structure based on silica and alumina, the surface of said hollow ceramic powder is coated with an inorganic coating layer based on a silicate compound (e.g. sodium silicate, potassium silicate etc.), said hollow ceramic powder is contained in such a state as to be uniformly dispersed at a proportion of 20 to 80% by weight in the base materials, and in said base materials there is a structure in which the neighboring hollow ceramic powders have been integrated with one another via said inorganic coating layer. The present process for producing said pottery article comprises mixing said clay with hollow ceramic powder, further adding water to knead the mixture, drying and calcination thereof.

3 Claims, 3 Drawing Sheets

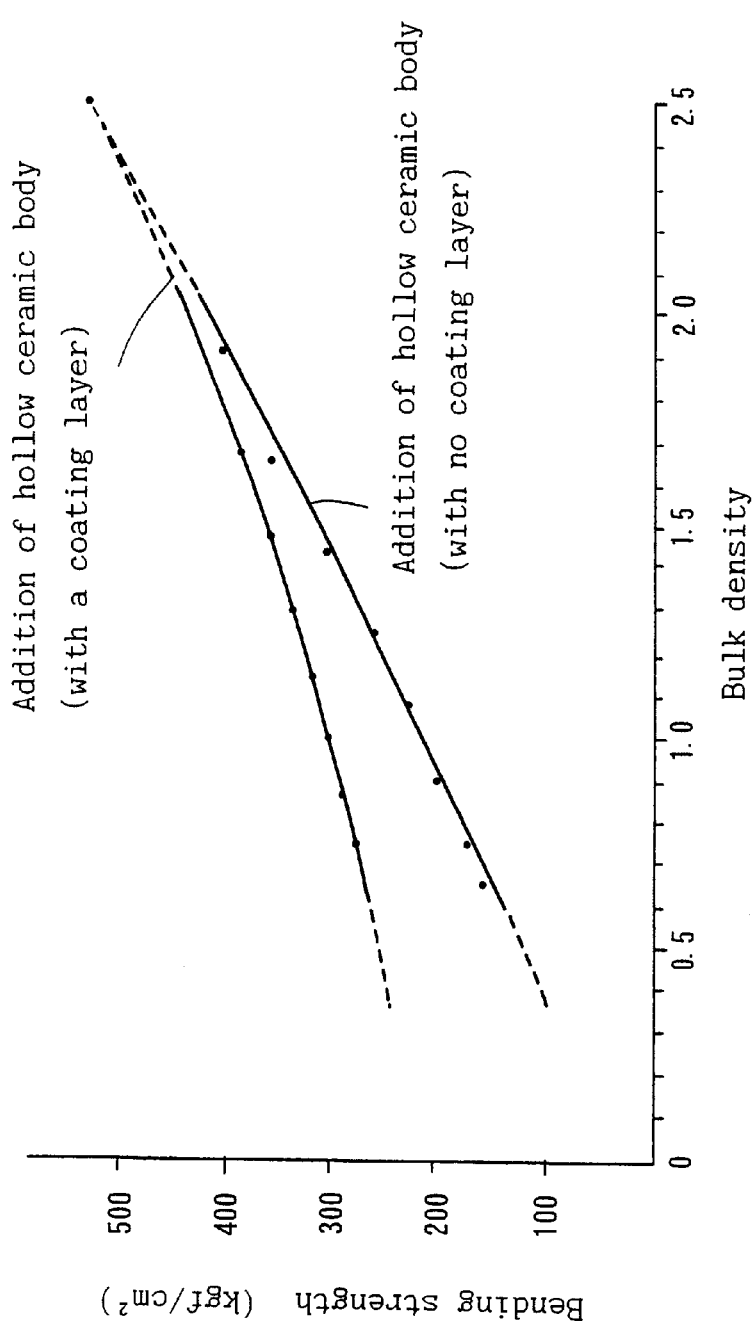
Fig. 2 Bulk density-bending strength correlation graph for calcinated articles obtained by kneading porcelain raw clay with a hollow ceramic body

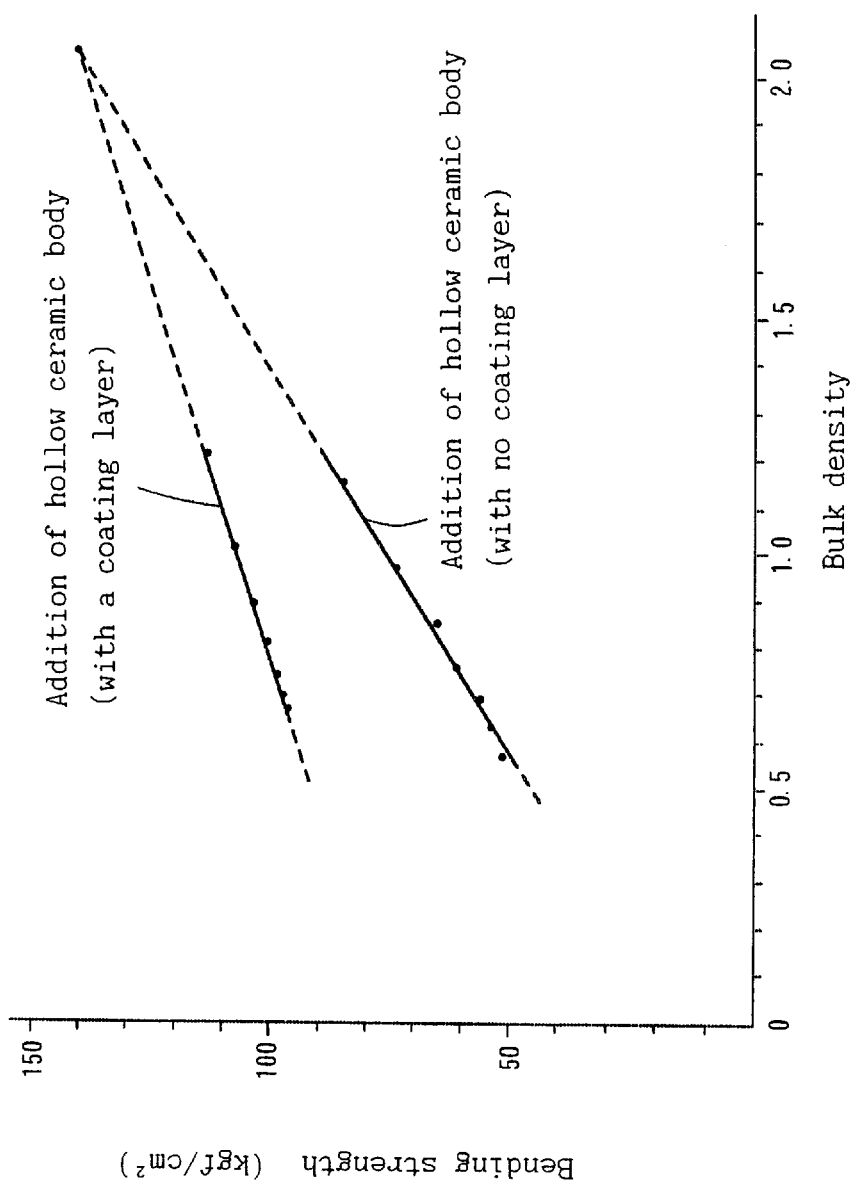
Fig. 3 Bulk density-bending strength correlation graph for calcinated articles obtained by kneading kibushi clay with a hollow ceramic body

LIGHT-WEIGHT POTTERY ARTICLE

BACKGROUND OF THE INVENTION

1. Field of the Invention

The present invention relates to high-strength light-weight pottery articles having lower specific gravity (e.g. 1.3 or less) than the specific gravity (2.3 to 2.5) of general pottery. Further, the present invention also relates to a process for producing such lightened pottery articles.

2. Background Art

At present, ceramic, porcelain and pottery contribute to a wide variety of fields in human life, but their high specific gravity is mentioned as one disadvantage of their characteristics. Their specific gravity is generally 2.3 to 2.5, and in view of the advantages of these materials, this weight is a great problem, and lightening is strongly desired. Further, in the fields of mainly building materials, fine arts, ceramic art and wall paintings, it is expected that if pottery having a beautiful glazed face, is capable of being arbitrarily carved and colored and being excellent in weatherability and thermostability, can be lightened, then its usability is further raised.

Some measures have been taken so far to lighten pottery. Such measures include (A) a method of mixing a foaming agent to form bubbles by calcination, (B) a method of mixing a previously foamed foaming agent (e.g. perlite etc.) in a main body of pottery, and (C) a method of mixing combustible materials (e.g. powdery polyesters and wood wastes etc.) and gasifying the mixture at high temperature to generate voids where such materials were present. (A) and (B) can be applied to porous materials (kaolin, sericite etc.) by mixing a foaming agent in cement materials, but formation of uniform and equal pores is difficult in the case of producing pore voids by mixing a foaming agent in clay and slip. In the case of (C), gasification occurs as the furnace temperature is raised and ignition may occur depending on the case, to destroy a main body of pottery. Accordingly, articles such as dishes etc. having a thickness of 20 mm or less can be produced, but those having larger thickness cannot be produced. In addition, any articles thus produced are very low in strength.

Further, there is the problem that significant shrinkage occurs in the case of general pottery upon drying and calcination after forming, and this significant shrinkage causes a scatter of the sizes of articles after calcination.

To solve such problems, Japanese Laid-Open Patent Publication No. 203,555 of 1988 or Japanese Laid-Open Patent Publication No. 52,781 of 1997 disclose a method of producing light-weight pottery or a light-weight pottery plate wherein a commercial powdery ceramic hollow body (silas balloon, glass balloon etc.) is mixed into raw clay, molded by extrusion molding or formed on a potter's wheel, or press-molded, and the resulting molded article is calcinated. However, when a commercial ceramic hollow body is merely mixed into e.g. the porous silas balloon etc., the resulting article after calcination is poor in strength, and a water-absorbing article only is obtained due to formation of open cells. In the case of the glass balloon, the article after calcination has high strength, but it does not have water absorption properties so that its water content is not uniformly distributed during extrusion molding by a clay kneader, the water is separated with time, and further its molding is difficult while there is a scatter of the qualities of the articles after calcination. In press forming, even if a highly strong ceramic hollow body is used, pressure is applied by press unevenly so that its hollow structure cannot endure the pressure, to undergo partial destruction, and water is absorbed, and there is a scatter of its strength, specific gravity etc., thus making press molding unfit for large-scale production of a molded body (pottery plate) having a large plane. When glass balloon etc. are used, a paste for a glaze can be made uneven.

Originally, ceramic clay increases plasticity as aging proceeds with time after the starting material is admixed sufficiently with water, and for this reason, its perfection is raised in manufacture and as an article, but there is the problem that stable kneading of ceramic clay is difficult when mixed with a ceramic hollow body not having water absorption properties. Further, there are cases where commercial organic binders etc. are used for ceramic clay lacking in flexibility, but there are a wide variety of binders which should be selected depending on uses and product specifications through troublesome experiences and experiments, and further the binder itself is expensive and gasified upon calcination to form open cells in the article itself, to make it difficult to produce a calcinated body having exclusively closed cells necessary for producing a high-strength body while water absorptivity is also raised, thus limiting its applicability. Further, there is also proposed a method of mixing soda silicate (water glass) etc. as inorganic binders when raw clay is kneaded, but such a method suffers from the problem that uniform dispersion is hardly achieved and further the ceramic hollow body is destroyed due to excessive kneading, and thus it is difficult to supply uniform and stable articles in this method too.

Furthermore, when the article after calcination obtained using such processes is destroyed and its surface is magnified under a microscope, it is seen that the ceramic body is not exfoliated from binders (ceramic clay etc.) in its rupture face, but destroyed and split into two pieces in almost all cases, and therefore, it is necessary to further reinforce the ceramic hollow body itself in order to improve the strength of the article.

SUMMARY OF THE INVENTION

The object of the present invention is to provide a high-strength light-weight pottery article which without losing the characteristics of pottery, is excellent in formability, has stabilized qualities and dimensional stability, and has lower specific gravity than that of usual pottery.

The present inventors found that the surface (spherical surface) of microspherical hollow ceramic powder (commercial product) having a hollow structure based on silica and alumina is coated with an inorganic coating layer based on a silicate compound to form a two-layer structure, and then mixed at a specific proportion with raw clay based on silica and alumina, and said inorganic coating is molten by calcination to form a structure in which neighboring hollow ceramic powders have been integrated with one another via said inorganic coating layer, thereby effectively solving any of the above-described problems, and that pottery having lower specific gravity and higher strength after calcination than those of general pottery articles can be obtained, and the present invention was thereby completed.

The light-weight pottery article of the present invention is a pottery article produced by adding a lightening agent to clay as a starting material based on silica and alumina, then kneading the mixture and forming the kneaded material into a desired form and calcinating the formed material, wherein the lightening agent is microspherical hollow ceramic powder having a hollow structure based on silica and alumina, the surface of said hollow ceramic powder is coated with an inorganic coating layer based on a silicate compound, said hollow ceramic powder is contained in such a state as to be uniformly dispersed at a mixing proportion of 20 to 80% by weight in the base materials in the pottery article, and in said base materials there is a structure in which the neighboring hollow ceramic powders have been integrated with one another via said inorganic coating layer.

Further, the present invention relates to the light-weight pottery article described above wherein the major component constituting the inorganic coating layer is selected from the group consisting of sodium silicate, potassium silicate, calcium silicate, lithium silicate, antimony silicate, amine silicate and cesium silicate.

In addition, the present invention relates to the light-weight pottery article described above, wherein the average particle diameter of the hollow ceramic powder is 45 to 250 $\mu$m, the melting point thereof is 1200° C. or more, and the thickness of said inorganic coating layer: the thickness of the spherical wall of the hollow ceramic powder is 0.5:1 to 2:1.

Furthermore, the present invention relates to a process for producing a light-weight pottery article having lower specific gravity than that of usual pottery by adding a lightening agent, which comprises preparing microspherical hollow ceramic powder having a hollow structure based on silica and alumina, said hollow ceramic powder being coated thereon with an inorganic coating layer based on a silicate compound, then mixing said hollow ceramic powder with clay based on silica and alumina such that the content of said hollow ceramic powder is 20 to 80% by weight, kneading the mixture after addition of water to make it uniform, forming the resulting kneaded material into a desired form and then drying thereof, followed by calcination at a temperature which is lower than the melting point of the hollow ceramic powder and at which said inorganic coating layer can be molten, thereby forming a structure in which the neighboring hollow ceramic powders have been integrated with one another via said inorganic coating layer.

Furthermore, the present invention relates to the process for producing a light-weight pottery article as described above, wherein the major component forming the inorganic coating layer is selected the group consisting of sodium silicate, potassium silicate, calcium silicate, lithium silicate, antimony silicate, amine silicate and cesium silicate.

Finally, the present invention relates to the process for producing a light-weight pottery article as described above, wherein the average particle diameter of the hollow ceramic powder is 45 to 250 $\mu$m, the melting point thereof is 1200° C. or more, and the thickness of said inorganic coating layer: the thickness of the spherical wall of the hollow ceramic powder is 0.5:1 to 2:1.

BRIEF DESCRIPTION OF THE DRAWINGS

FIG. 2 is a graph showing bulk density-bending strength correlation for calcinated articles obtained by kneading porcelain raw clay with a hollow ceramic body when the outer periphery of the hollow ceramic body is coated or not coated with an inorganic coating layer.

FIG. 3 is a graph showing bulk density-bending strength correlation for calcinated articles obtained by kneading kibushi clay with a hollow ceramic body when the outer periphery of the hollow ceramic body is coated or not coated with an inorganic coating layer.

DETAILED DESCRIPTION OF THE INVENTION

Figure 1:
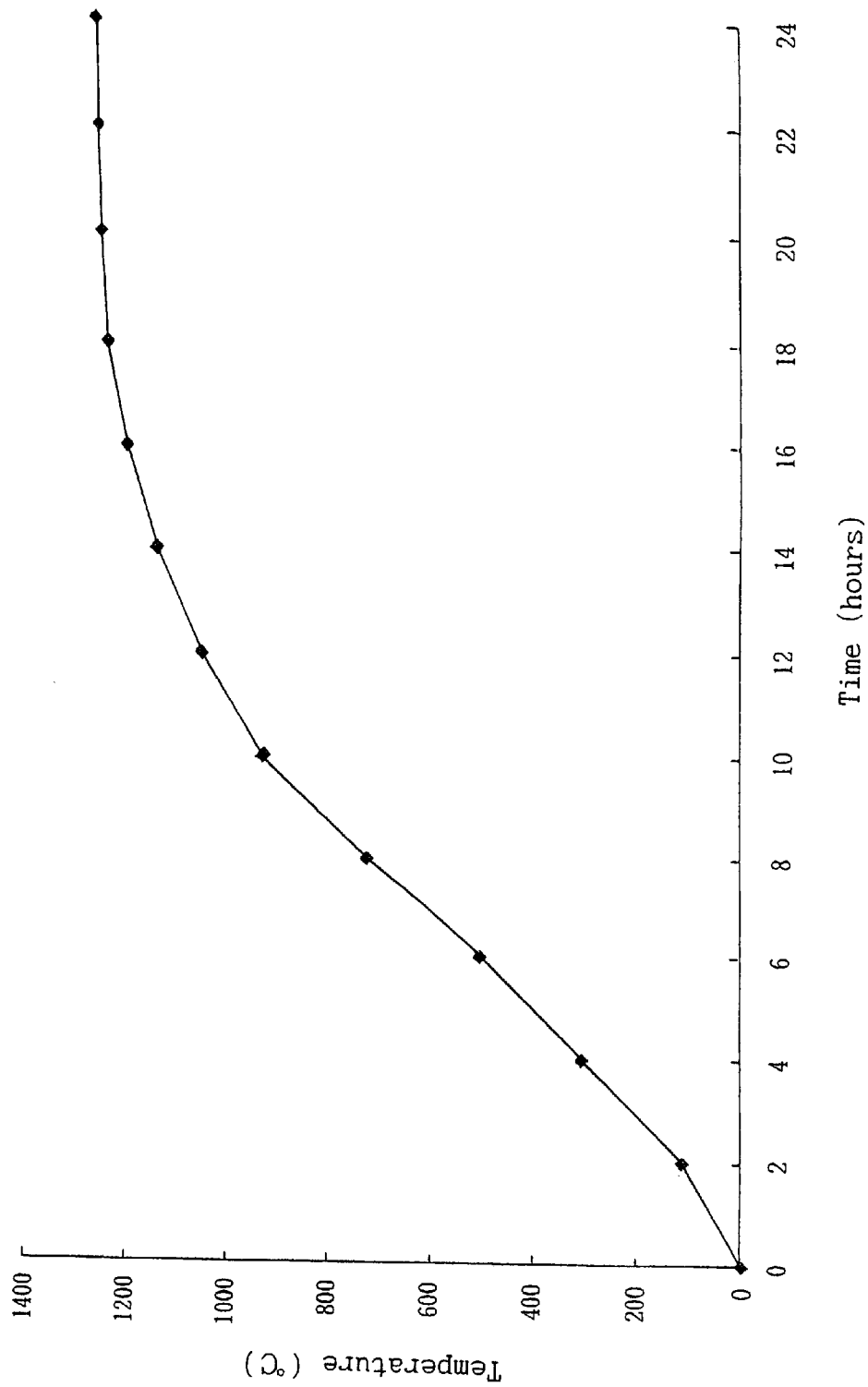
FIG. 1 is a calcination temperature curve in the Examples.

First, the light-weight pottery article of the present invention is described.

The light-weight pottery article of the present invention is produced by adding a lightening agent to clay as a starting material based on silica and alumina, kneading the mixture such that the lightening agent becomes uniformly dispersed in the clay, and forming the kneaded material thus obtained into a desired form and calcinating it. In the light-weight pottery article of the present invention, the lightening agent makes use of microspherical hollow ceramic powder (closed hollow body) having a hollow structure based on silica and alumina, said hollow ceramic powder being coated thereon with an inorganic coating layer based on a silicate compound, and this hollow ceramic powder is present in a uniformly dispersed state at a mixing proportion of 20 to 80% by weight in the base materials of the pottery article where some neighboring hollow ceramic powders are integrated with one another through melting of said inorganic coating layer.

The core material (spherical ceramic hollow body) contained as the lightening agent in the light-weight pottery article of the present invention is based on silica and alumina, thus making it superior in thermostability, and its hollow structure leads to low specific gravity (e.g., not more than 0.5 g/cm$^3$ which is lower than the specific gravity of water). The effects of such core-containing hollow ceramic powder when added are that lightening is achieved, an article excellent in dimensional stability with shrink reduced is obtained, the fluidity of the kneaded material is improved, and the strength of the article is improved.

From the viewpoint of workability and strength in the present invention, the average particle diameter of the hollow ceramic powder described above is preferably 45 to 250 $\mu$m, more preferably 80 to 175 $\mu$m, most preferably 100 to 130 $\mu$m. Further, the melting point of this hollow ceramic powder is preferably higher than the calcination temperature so as not to destroy the hollow structure during calcination, and usually a powder having a melting point of 1200° C. or more is used. However, if calcination is conducted at a high temperature of 1200 to 1300° C., hollow ceramic powder with a melting point of about 1500 to 1600° C. is preferably used.

In the present invention, said hollow ceramic powder used as the core material may be commercial fillers for cement and gypsum, and it is possible to employ e.g. high-strength light-weight fillers (Easfiase™ SL150, SL180, SLG etc.).

In the present invention, the surface of hollow ceramic powder is coated with an inorganic coating layer based on a silicate compound, and a major material suitable for constituting this inorganic coating layer includes e.g. sodium silicate, potassium silicate, calcium silicate, lithium silicate, antimony silicate, amine silicate and cesium silicate, and alkali silicates are particularly effective. The specific composition of the most preferable coating layer in the present invention is a mixture of sodium silicate (water glass), alumina, boric acid, sodium carbonate, calcium oxide and potassium oxide.

Generally, for producing the hollow ceramic powder coated with an inorganic coating layer, the outer periphery of a high-strength ceramic hollow body (thermostable at 1300° C. or more) substantially not absorbing water is surface-coated by e.g. spray coating where the ratio of the thickness of this inorganic coating layer to the thickness of the spherical wall of the hollow ceramic powder is most effectively 50 to 200% (that is, the thickness of the inorganic coating layer: the thickness of the spherical wall of the hollow ceramic powder=0.5:1 to 2:1). This is because if the ratio in thickness is lower than the lower limit, the effect thereof as the reinforcing agent tends to be lowered, whereas if this ratio is higher than the upper limit, the effect of lightening as the major object tends to be lowered.

Just after the commercial ceramic hollow body is coated, this inorganic coating layer is dried at a temperature of 60° C. or more, dehydrated and burned at 700 to 800° C. whereby a porous structure is formed to provide strength enough to endure kneading for molding or the pressure in press forming. Then, the two-layer-structured hollow ceramic thus obtained is mixed with other raw clay for pottery and calcinated at a temperature (e.g. about 1250° C. to 1300° C.) which is lower than the thermostability temperature of the hollow ceramic and causes the inorganic coating layer to be molten so that the hollow ceramic as the core material remains without being molten while the porous ceramic layer is molten insitu to form a glassy material serving as a reinforcing agent for integrating neighboring ceramic hollow bodies (core material) with one another and further serving as an agent for preventing water absorption.

In the pottery article of the present invention, the hollow ceramic powder described above is contained at a mixing proportion of 20 to 80% by weight in the base materials, that is, at a proportion of clay: hollow ceramic powder=80 to 20:20 to 80 (ratio by weight), and if the proportion of hollow ceramic powder contained therein is less than 20% by weight, there is no problem with strength, but there is the advantage of lower effect of lightening. On the other hand, the proportion of hollow ceramic powder contained therein exceeds 80% by weight, significant lightening can be achieved, but there is the disadvantage that molding is made very difficult and the strength of the article after calcination is significantly reduced. In consideration of the utility and production costs of the article, the proportion of hollow ceramic powder contained therein is suitably 30 to 70% by weight, and the most practical proportion is 30 to 50% by weight (or the proportion of clay contained therein is 70 to 50% by weight).

In the pottery article of the present invention, the hollow ceramic powder having small bulk density is present in an uniformly dispersed state in the base materials, so the bulk density of the article after calcination can be reduced to about a half to quarter of the bulk density of the article not containing the hollow ceramic powder. Although articles having various bulk densities can be obtained by suitably selecting the proportion of the hollow ceramic powder contained therein, general bulk density is about 0.5 to 1.3 g/cm$^3$.

On the other hand, the clay used for producing the light-weight pottery article of the present invention is not particularly limited, and kaolin, sericite, 'kibushi' clay, semi-porcelain (a mixture of kaolin and kibushi) are particularly preferable. Among these, kibushi clay is clay accumulated in a layer at the first stage of the Pliocene epoch, and this clay is composed mainly of finely ground kaolin minerals containing small amounts of quartz, feldspar and titanium minerals, its flexibility is high, and its fire resistance is SK30-34. The advantages of kibushi clay used as the starting material are that flexibility is raised, moldability is improved, costs are reduced, fixation of glaze (lime glaze, ash glaze etc.) is stabilized, glaze can be selected from various materials, products of stabilized qualities can be provided, and other ceramic clay can be incorporated.

When the above clay is kneaded with the hollow ceramic powder in the present invention, a binder may be added along with water to increase the flexibility of the kneaded material at the time of molding. Commercial binders for extrusion which are blended so as to be suitable for alumina type powder etc. can be used when the kneaded material is extrusion-molded. Suitable binders for extrusion include Selander™ (Yuken Kogyo K.K.), and such binders also work for preventing dry cracks.

However, such binders are arbitrarily added components in the light-weight pottery article of the present invention wherein the above-described hollow ceramic powder coated thereon with an inorganic coating layer is dispersed in the raw materials, and they are not such essential components as in commercial hollow ceramic powder not having the inorganic coating layer.

Hereinafter, the invented process for producing the light-weight pottery article is described.

In the process of the present invention, the above-described hollow ceramic powder and clay are previously mixed in a powdery form such that the content of the hollow ceramic powder is 20 to 80% by weight, and after water is added thereto, the mixture is kneaded until it becomes uniform, and its hardness and viscosity are regulated so as to be suitable for molding. Then, the resulting kneaded material is molded into a desired form. The molding method is not particularly limited, and foundry molding, molding on "potter's wheel", or press molding can be used. For example, extrusion molding in a clay kneader may also be conducted.

The molded body obtained in these molding methods are dried slowly so that cracking does not occur, during which the surface of the molded body can also be engraved. Generally, the process of the present invention involves previous removal of water from the starting material by drying, then burning thereof, applying glaze thereto and calcination thereof, but glaze may not be applied if no decoration of the surface of the product is necessary.

The temperature (calcination temperature) selected for conducting calcination in the process of the present invention is usually about 1200 to 1300° C., which is lower than the melting point of the hollow ceramic powder so as not to destroy the hollow structure of the ceramic powder and which causes said inorganic coating layer to be molten such that neighboring layers are integrated with one another.

In the process of the present invention, dispersibility is improved by the inorganic coating layer formed on the external surface of the hollow ceramic powder, so there is the advantage that excessive kneading required in the conventional process where soda silicate etc. are added as inorganic binders is not necessary, thus preventing the destruction of the hollow structure of hollow ceramic powder and providing uniform and stabilized products.

Hereinafter, the present invention is described in more detail by reference to the Examples, which however are not intended to limit the present invention.

EXAMPLES

Example 1

Production of the Light-Weight Pottery Article of the Invention (Production by Press Molding)

As a ceramic hollow body serving as the core material, Easfias SL150™ (Australia E Ltd.) (bulk density, 0.25 to 0.42; compression strength [40% when viable], 700 kgf/cm$^2$; melting point, 1600° C.; and particle diameter, 20 to 150 μm) was provided and classified, and particles of about 150 μm in diameter were selected and used. The appearance of this ceramic hollow body is white powder, and its chemical components are 59.7% $SiO_2$, 38.3% $Al_2O_3$, 0.40% $Fe_2O_3$, 0.20% CaO, 1.09% $TiO_2$, and 0.30% ignition loss.

Then, water was added to regulate the viscosity of a coating agent for forming an inorganic layer consisting of 54.9% silicic acid, 12.6% sodium oxide, 5.7% calcium oxide, 8.4% potassium oxide, 15.8% alumina, and 3% lead borate. Further, sodium oxide and potassium oxide were added for the purpose of flux, alumina was mixed for regulation of strength and porosity after burning and calcination, and lead borate was mixed as flux and for glass viscosity at low temperature. Besides, a small amount of polyvinyl alcohol was added as a curing agent after coating.

For coating the surface of the ceramic hollow body with the coating agent, the ceramic hollow body is jetted and simultaneously spray-coated with the coating agent, and the hollow body during dropping is rapidly dried with hot air at about 90 to 100° C. To attain uniform curing of the coating, the above process was repeated 3 times.

According to the process described above, the ceramic hollow body of 150 μm in diameter and about 10 μm in wall thickness, provided thereon with an inorganic coating layer of about 10 to 15 μm in thickness, was obtained, and when subjected to oxidative calcination at about 800° C., gave two-layer-structured hollow ceramic powder.

Then, a mixture of kaolin and feldspar as raw clay for pottery was mixed with the hollow ceramic powder at a mixing proportion (80 parts by weight to 10 parts by weight: 20 parts by weight to 90 parts by weight) shown in Table 1 below, and the mixture was kneaded while 10 parts by weight of water was added thereto, and this mixed powder was press-molded at a pressure of 200 kgf/cm² into a size of 150×150×10 mm, then dried in a drying chamber at 60° C. for 24 hours, and subjected to oxidative calcination at a temperature of about 1280° C. to produce the light-weight pottery article of the present invention. The reason that kaolin and feldspar were mixed is for improvement of the strength of the article after calcination and for regulation of specific gravity. FIG. 1 is a calcination temperature curve in this example, and a electric furnace with a metal resistance of 30 KW was used for calcination.

Separately, the product to which the hollow ceramic powder was not added was also prepared as the control.

10 plates thus produced at the respective proportions were measured for bulk density, bending strength and water absorptivity (cold water absorptivity). The measurement results are shown in Table 1 below.

Bulk density—dry weight/(saturated water weight–weight in water)

Bending strength—$3Wl/2bd^2$ wherein W=breaking load, l=distance between supports, b=width of test specimen, d=thickness of test specimen Cold water absorptivity—The test specimen was dried, immersed in purified water at ordinary temperatures for 24 hours, wiped with a cloth and immediately measured. [(Saturated water–weight dry weight)/dry weight]×100.

The bending strength and cold water absorptivity were determined according to JIS A 5209.

TABLE 1

| Pottery raw clay: Hollow ceramic (with a coating layer) | Bulk density | Bending strength (kgf/cm²) | Cold water absorptivity (%) |
|---|---|---|---|
| 100:0 | 2.50 | 520.1 | 1.1 |
| 80:20 | 1.92 ± 0.11 | 412.5 ± 2.2 | 0.9 |
| 70:30 | 1.68 ± 0.12 | 376.2 ± 1.6 | 1.0 |
| 60:40 | 1.48 ± 0.10 | 350.0 ± 1.8 | 1.0 |
| 50:50 | 1.31 ± 0.08 | 329.7 ± 2.1 | 0.9 |
| 40:60 | 1.15 ± 0.09 | 311.9 ± 2.1 | 0.9 |
| 30:70 | 1.01 ± 0.05 | 297.3 ± 1.8 | 0.8 |
| 20:80 | 0.87 ± 0.10 | 282.5 ± 2.0 | 0.8 |
| 10:90 | 0.75 ± 0.11 | 270.1 ± 1.7 | 0.8 |

Comparative Example 1

Production of Light-Weight Pottery Product Using Ceramic Hollow Body Having No Inorganic Coating Layer The ceramic hollow body under the same conditions used in Example 1 was kneaded, without subjection to coating, with the pottery raw clay for pottery (a mixture of kaolin and feldspar) at a mixing proportion shown in Table 2, then dried and calcinated under the same conditions as in Example 1.

10 plates thus prepared at the respective proportions were measured for bulk density, bending strength and water absorptivity (cold water absorptivity). The measurement results are shown in Table 2 below.

TABLE 2

| Pottery raw clay: Hollow ceramic (no coating layer) | Bulk density | Bending strength (kgf/cm²) | Cold water absorptivity (%) |
|---|---|---|---|
| 100:0 | 2.50 | 520.1 | 1.1 |
| 80:20 | 1.92 ± 0.40 | 396.1 ± 7.2 | 2.8 |
| 70:30 | 1.66 ± 0.33 | 349.2 ± 8.0 | 2.4 |
| 60:40 | 1.44 ± 0.41 | 297.4 ± 7.0 | 3.2 |
| 50:50 | 1.26 ± 0.44 | 256.9 ± 5.2 | 2.7 |
| 40:60 | 1.08 ± 0.27 | 220.0 ± 8.5 | 3.1 |
| 30:70 | 0.90 ± 0.40 | 196.5 ± 4.2 | 3.6 |
| 20:80 | 0.75 ± 0.39 | 165.0 ± 3.9 | 3.5 |
| 10:90 | 0.65 ± 0.46 | 153.0 ± 4.7 | 2.9 |

As can be seen from the experimental results in Tables 1 and 2 above, the pottery article of the present invention obtained in Example 1 can be lightened, and by providing the surface of the ceramic hollow body with an inorganic coating layer, its strength is significantly raised as compared with that of the control not provided with the coating, and its water absorptivity is 1% or less (as opposed to 2.4 to 3.6% in Comparative Example 1), thus achieving satisfactory utility. Further, the product in Comparative Example 1 has a significant scatter of numerical values determined for physical properties, whereas the product in Example 1 indicates uniform physical properties with little scatter.

FIG. 2 is a graph showing the correlation between bulk density and bending strength, prepared on the basis of the experimental results in Tables 1 and 2 above, and as can be seen from this graph, the product of the present invention in Example 1 has higher strength than that of the product in Comparative Example 1 although both of them have the same bulk density, indicating that even if the proportion of the hollow ceramic powder incorporated is raised to decrease bulk density, there is little reduction in the strength of the resulting product.

Then, when the product was cut and its cut area was observed under magnification, the ceramic hollow body in the product of Comparative Example 1 was destroyed near the surface (face contacting with a pressing die), whereas the ceramic hollow body in the product of Example 1 was hardly destroyed, and it could thus be confirmed that its balloon state was maintained.

Example 2

Production of the Light-Weight Pottery Article of the Invention by Extrusion Molding The hollow ceramic powder with a two-layer structure obtained in Example 1 was mixed with plastic kibushi clay at a mixing proportion shown in Table 3, then kneaded with 25 parts by weight of water and extrusion-molded in a vacuum clay kneader to prepare 10 molded plates with the same size as in Example 1. The chemical components in the kibushi clay used were 48.6% $SiO_2$, 34.1% $Al_2O_3$, 1.1% $Fe_2O_3$, 0.4% CaO, 0.6% $TiO_2$, 0.2% MgO, 0.7% $K_2O$ and 0.2% $Na_2O$.

Thereafter, the resulting molded article was dried at about 40° C. for 10 hours and then at 60° C. for 24 hours in a drying chamber and subjected to oxidative calcination at 1280° C. in an electric furnace in the same manner as in Example 1.

Separately, the product to which the hollow ceramic powder was not added was also prepared as the control.

10 plates thus produced at the respective proportions were measured for bulk density, bending strength and water absorptivity (cold water absorptivity). The measurement results are shown in Table 3 below.

TABLE 3

| Kibushi clay: Hollow ceramic (with a coating layer) | Bulk density | Bending strength (kgf/cm$^2$) | Cold water absorptivity (%) |
|---|---|---|---|
| 100:0 | 2.03 | 140.1 | 12.5 |
| 80:20 | 1.21 ± 0.20 | 113.2 ± 2.0 | 8.0 |
| 70:30 | 1.01 ± 0.20 | 107.0 ± 1.9 | 7.5 |
| 60:40 | 0.89 ± 0.17 | 102.7 ± 1.8 | 7.0 |
| 50:50 | 0.81 ± 0.13 | 100.5 ± 1.9 | 6.4 |
| 40:60 | 0.74 ± 0.10 | 98.0 ± 2.0 | 5.8 |
| 30:70 | 0.70 ± 0.11 | 97.4 ± 1.9 | 4.9 |
| 20:80 | 0.67 ± 0.12 | 96.0 ± 1.7 | 4.0 |

Comparative Example 2

Production of Product Using Ceramic Hollow Body Having No Inorganic Coating Layer (by Extrusion Molding)

The ceramic hollow body under the same conditions used in Example 1 was mixed, without subjection to coating, with the above-mentioned kibushi clay at a mixing proportion shown in Table 4, and 10 calcinated plates were prepared for each sample in the same manner as in Example 1.

The products prepared at the respective mixing proportions were examined for their bulk density, bending strength and water absorptivity (cold water absorptivity) (n=10). The measurement results are shown in Table 4 below.

TABLE 4

| Kibushi clay: Hollow ceramic (no coating layer) | Bulk density | Bending strength (kgf/cm$^2$) | Cold water absorptivity (%) |
|---|---|---|---|
| 100:0 | 2.03 | 140.1 | 12.5 |
| 80:20 | 1.15 ± 0.48 | 84.2 ± 3.1 | 12.7 |
| 70:30 | 0.97 ± 0.33 | 73.1 ± 4.2 | 11.9 |
| 60:40 | 0.85 ± 0.31 | 64.4 ± 2.0 | 8.3 |
| 50:50 | 0.76 ± 0.41 | 60.9 ± 6.1 | 7.5 |
| 40:60 | 0.69 ± 0.51 | 55.7 ± 5.4 | 7.5 |
| 30:70 | 0.63 ± 0.52 | 53.0 ± 1.7 | 7.1 |
| 20:80 | 0.57 ± 0.45 | 51.9 ± 3.2 | 6.9 |

As can be seen from the experimental results in Tables 3 and 4 above, the pottery article of the present invention obtained in Example 2 can be lightened, and by providing the surface of the ceramic hollow body with an inorganic coating layer, its strength is significantly raised as compared with that of the control not provided with the coating, and its water absorptivity is low, thus achieving satisfactory utility. Further, the product in Comparative Example 2 has a significant scatter of numerical values determined for physical properties, whereas the product in Example 2 indicates uniform physical properties with little scatter.

FIG. 3 is a graph showing the correlation between bulk density and bending strength, prepared on the basis of the experimental results in Tables 3 and 4 above, and as can be seen from this graph, the product of the present invention in Example 2 has higher strength than that of the product in Comparative Example 2 although both of them have the same bulk density, indicating that even if the proportion of the hollow ceramic powder incorporated is raised to decrease bulk density, there is little reduction in the strength of the resulting product.

Then, when the product was cut and its cut area was observed under magnification, the ceramic hollow body in the product of Comparative Example 2 was destroyed near the surface (face contacting with a pressing die), whereas the ceramic hollow body in the product of Example 2 was hardly destroyed, and it could thus be confirmed that its balloon state was maintained.

From the experimental results in Tables 1 to 4, it is understood that by addition of the hollow ceramic powder, the bulk density of the article after calcination can be reduced to about a half to quarter of the bulk density of the article not containing the hollow ceramic powder, thus providing the pottery article having a lower gravity than 1.0 i.e. the specific gravity of water.

As illustrated hereinbefore, in the light-weight pottery article of the present invention, the two-layered, low bulk density and high-strength hollow ceramic powder coated with an inorganic coating layer on the whole surface of the ceramic hollow body as the core material is present in a uniformly dispersed state in base materials, thus exhibiting extremely higher strength, lower specific gravity and lower shrinkage after drying and calcination than those of conventional pottery while attaining excellent dimensional accuracy of the article. Furthermore, all the beauty, freedom of expression, and arbitrary shape of the pottery are maintained without losing the original characteristics of the pottery, and thus the pottery article of the invention can be applied to very wide utilities such as ornaments besides various shearing materials for buildings, and has earthquake resistance, fire resistance, weatherability etc. required of building materials. In particular, the pottery article of the present invention with a lower gravity than 1.0 i.e. the specific gravity of water has the advantage of its floating on water. In the hollow ceramic powder coated with an inorganic coating layer in the present invention, the porous material on the surface thereof acts as a water retainer (binder) during molding or as a shock absorber for protecting the core material against uneven pressure during press molding, and further its aqueous properties improve the adhesion of glaze. At the time of calcination, the porous material on the surface thereof is molten to serve as a reinforcing agent for mutually bonding ceramic hollow bodies (core material) and further as a water absorption-preventing agent after converted into a glassy material.

Further, light-weight and high-strength pottery articles can be obtained using the process of the present invention.

What is claimed is:

1. A pottery article, comprising:
   a) a kneaded, calcinated mixture formed into a desired form, the mixture including clay based on silica and alumina;
   b) a lightening agent constituted of microspherical hollow ceramic powder having a hollow structure based on silica and alumina, said hollow ceramic powder having a surface coated with an inorganic coating layer based on a silicate compound, said hollow ceramic powder being a uniform dispersion at a mixing proportion of 20 to 80% by weight of the mixture; and
   c) neighboring hollow ceramic powders being integrated with one another via the inorganic coating layer.

2. The pottery article according to claim 1, wherein the inorganic coating layer has a major component selected from a group consisting of sodium silicate, potassium silicate, calcium silicate, lithium silicate, antimony silicate, amine silicate and cesium silicate.

3. The pottery article according to claim wherein the hollow ceramic powder has an average particle diameter of 45 to 250 $\mu$m, a melting point of at least 1200° C., and a ratio of a thickness of the inorganic coating layer to a thickness of a spherical wall of the hollow ceramic powder in a range from 0.5:1 to 2:1.

* * * * *